Sept. 9, 1941.  C. A. SCHULMAN  2,255,631
MICROSCOPE
Filed July 9, 1940
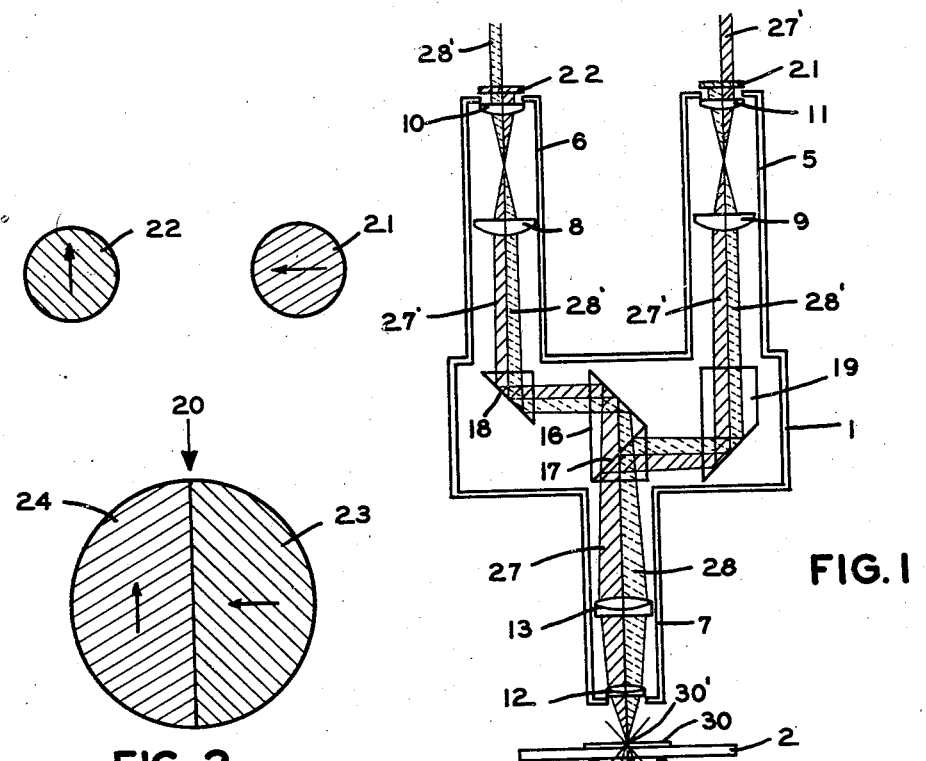
FIG. 1
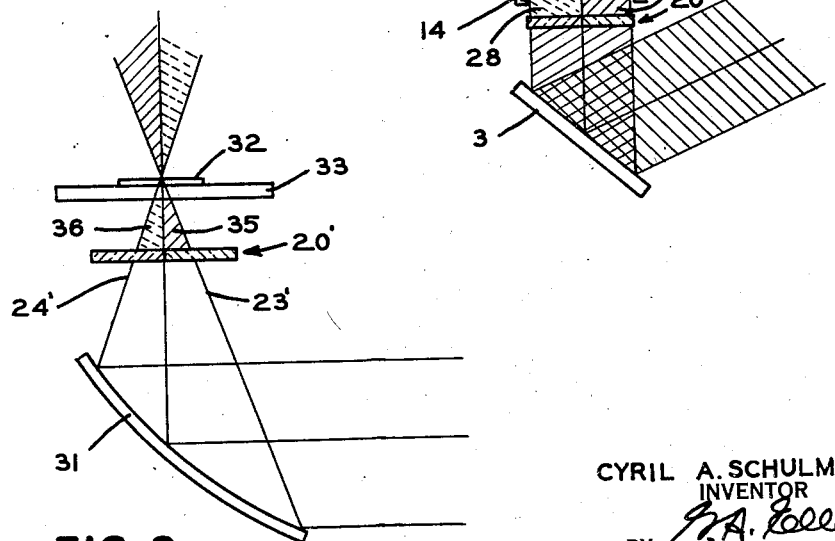
FIG. 2
FIG. 3
CYRIL A. SCHULMAN
INVENTOR
BY
ATTORNEYS Patented Sept. 9, 1941

2,255,631

UNITED STATES PATENT OFFICE 2,255,631

MICROSCOPE

Cyril A. Schulman, Washington, D. C.

Application July 9, 1940, Serial No. 344,517

3 Claims. (Cl. 88—39)

The invention relates to microscopes and more particularly has reference to a microscope in which the third dimensional effect of depth is obtained in the view of the object or specimen undergoing examination.

This application is a continuation in part of my copending application Serial No. 185,425, filed January 17, 1938, for Improvement in stereoscopic microscope.

I have as a major object of my invention the provision of a microscope having improved means whereby the view of the object or specimen is obtained with a created third dimensional effect.

An equally important object of the invention is the provision in a binocular mono-objective microscope of means utilizing polarized light in such manner that the view of an object being observed is obtained in relief.

Another object of the invention is to provide a binocular mono-objective microscope with means utilizing a plurality of illuminating light rays, substantially equal numbers of which have been polarized in mutually perpendicular planes, to simulate the depth of an examined object in its magnified image.

I have as a still further object of my invention, the provision in a microscope of the type providing either an inverted or an erect image and having right and left oculars, of means for creating a third dimensional effect in the view of the object undergoing observation by directing a substantially equal number of light rays onto the object from the right and left sides thereof, polarizing the rays directed from the right and the rays directed from the left in different planes, and analyzing each portion of these rays received at each ocular so that only the rays illuminating the object from the right are allowed to pass through the right ocular and only those rays illuminating the object from the left are allowed to pass through the left ocular.

With these and other objects in view, which may be incident to my improvements, the invention consists in the parts and combinations to be hereinafter set forth and claimed, with the understanding that the several necessary elements comprising my invention may be varied in construction, proportion and arrangement without departing from the spirit of the invention and the scope of the appended claims.

One manner of practically effecting the concept of my invention makes use of a binocular single objective microscope whereby a plurality or a bundle of light rays whose half sections are polarized in planes at right angles to each other are employed to illuminate an object undergoing examination. The right half section of this bundle is employed to illuminate the object from its right while the left half is employed to illuminate the object from its left. After the ray sections have illuminated the object they pass through an objective and are then divided so that two portions of light of substantially equal intensity are directed to each ocular. Each of these divided portions of the ray bundle are like the bundle itself in that they are composed of differently polarized light. In other words, part of the light of each portion is polarized in a plane at right angles to the remainder of the polarized light in the portion. To obtain the sense of depth in the view of the examined object, an analyzer designed to filter or cut out certain parts of the polarized light is associated with each ocular so that each ocular only allows light to pass therethrough which comes from the same side of the object as that viewed thereby. By suitable orientation of the analyzers, it should be observed that the invention is susceptible to practice with a microscope of the type described which may or may not be provided with an erecting system for erecting the normally inverted image formed of the object.

Also comprehended by the invention in the practice of its various modifications is the use of either a lens element or a mirror or other concentrating device for converging and concentrating the illuminating rays onto an examined object as well as the full use of the positioning range of the polarizing and analyzing means so as to permit location of these means at different and convenient operating positions.

In order to make my invention more clearly understood, I have shown in the accompanying drawing means for carrying the same into practical effect without limiting the improvements in their useful applications to the particular constructions, which for the purpose of explanation, have been made the subject of illustration.

In the drawing:

Figure 1 is a schematic view of a mono-objective, binocular microscope employing my invention and showing an optical system, which provides an inverted image, associated with the instrument together with a ray diagram for the system.

Figure 2 is a diagrammatic view illustrating the relation of the polarizing devices shown in Figure 1.

Figure 3 discloses another form of the invention and is a schematic view similar to Figure 1 but showing only the stage and sub-stage devices of the modified instrument.

With reference to the drawing, wherein similar reference numerals indicate like parts, there is shown in Figure 1 a microscope having a binocular body 1, stage 2, mirror 3 and sub-stage condenser 4 supported in any well known manner on the usual microscope stand. The binocular body which is of the usual design and which may be constructed in any well known manner is provided with ocular tubes and oculars 5 and 6 and a single objective tube and objective 7. To simplify the drawing the oculars have been shown as consisting, respectively, of only the front lens 8 and 9 and the back lens 10 and 11 mounted directly in the ocular tube of the binocular body. Similarly the objective 7 has been shown as formed of the front lens 12 and back lens 13 mounted directly in the objective tube while the condenser has been disclosed as comprised of front lens 15 and back lens 14.

In a microscope such as that just described, one observes as inverted image of the object undergoing examination. This image may be erected by use of a suitable erecting system associated with the instrument but not shown in the drawing to the end of their simplification. An erecting system is readily added to the optics of a microscope of this nature and is so well known to the art as to need no detailed explanation. The description which follows generally concerns an instrument which provides an inverted image except insofar as the basic stereoscopic principles underlying the invention are applicable to a binocular mono-objective microscope which may or may not have an image erecting system and refers only to an instrument with an erecting system where such is specially mentioned.

Obviously the invention is not limited to the particular optics of the oculars, the objective and the condenser which have been illustrated but may have these widely varied in any manner well known to the art. It will also be well understood that within the scope of the invention is the substitution of a revolving nosepiece carrying a plurality of objectives for the type of single objective disclosed while it will be appreciated that the invention contemplates the use of either a corrected or uncorrected condenser and even one employing only a single lens element.

The other optical elements within the binocular body consist of the usual silvered prism 16 with the half silvered surface 17 and the reflecting prisms 18 and 19. All of these prisms are located in the usual positions and are employed in the usual manner to split or divide the light within the binocular body, which light comes from the objective, into two portions of substantially equal intensity and to direct one of these light portions to the ocular 5 and the other light portion to the ocular 6.

The optical system heretofore described has been that of the usual binocular mono-objective microscope which gives an inverted image but with which binocular vision is of course obtained. In such an instrument, it will be appreciated that if light rays are directed onto the right and left sides of an object to illuminate it, a portion of these right and left rays will be directed to the right eye of a worker and also a portion of these illuminating rays will be directed to the left eye of the worker. In obtaining the effect of stereoscopic vision or the third dimensional effect of depth, light rays which illuminate the right of an object or which appear to come from the right side of the object should be viewed only by the right eye, the left hand rays being cut off or excluded, and similarly those rays appearing to come from the left of the object should be seen by the left eye only.

To obtain the effect of depth in the view of the image of the object or to observe this image in relief, the invention makes use of the stereoscopic principles just heretofore outlined. This is accomplished, in the form of the invention disclosed in Figure 1, by employing a polarizing device 20 located between the mirror 3 and condenser 4 and by the use of similar analyzing devices 21 and 22 located over the eyepiece of each ocular.

The polarizing device 20 may be constructed of any suitable polarizing material, preferably however, of sheet or plate material known commercially as "Polaroid" and formed of an oriented suspension of small dichroic crystals in an organic plastic. Polarizer 20 is of disk shape and is divided into two oppositely polarizing sectors 23 and 24 each of 180 arcuate degrees, which sectors as indicated by the heavy arrows in Figure 2 have mutually perpendicular planes of polarization. Hence if the polarizer is interposed in the path of a plurality of light rays, it will polarize the rays passing through its two polarizing sectors at right angles with respect to each other. Also, should the path of the rays be such that equal numbers of them pass through each polarizing sector, then one half of them will be polarized in a plane which is perpendicular to the other half.

As is well known, an analyzer or for that matter any piece of polarizing material will pass light which has been polarized in a plane parallel to its own plane of polarization but will cut out or exclude light which has been polarized in a plane perpendicular to the plane of polarization of the analyzer. I effectively make use of this phenomenon to cut out undesirable portions of polarized light at each ocular. To this end each analyzer is formed of a single section of polarizing material and is oriented at each eyepiece so that it is crossed or has its polarizing plane perpendicular to the plane of polarization of the undesirable light. Figure 2 also discloses this arrangement and by the heavy arrows on the analyzers shows that analyzer 21 will allow only light from the right side of an object to pass therethrough while cutting out light from the left and that similarly analyzer 22 will transmit only light from the left of the object.

The analyzers 21 and 22 may be constructed of material similar to that employed for the polarizer 20. However, within the scope of the invention is the use of Nicol prisms of Iceland spar or of tourmaline for the analyzing and also for the polarizing means. In fact any suitable polarizing material may be employed. Many variations may be made in the location and also in the manner of mounting the analyzers and the polarizer in operative position. A successful commercial practice in this regard, which is suggested by the drawing, includes mounting each analyzer in a cap of cylindrical shape which may be slipped over the end of an ocular for detachable support thereon. The polarizer, which is preferably of disk shape as shown, may be provided with a rim. In practice it is detachably mounted in the usual accessory support slot for sub-stage attachments such as filters and the like.

With special reference to Figure 1, the manner in which I am able to obtain the effect of depth of the object under observation will become apparent from a consideration of the ray diagram associated with the drawing. Therein illustrated is a ray diagram for a single point 30' on the object 30 which is shown in mounted position upon the stage. For the sake of simplicity in the drawing, only one of the many illuminated points on the object or in the field of view has been made the subject of illustration, this point 30' being located at the center of the object as is usual where ray diagrams are employed for illustrative purposes. Obviously light illuminating other points on the object will follow ray diagram patterns similar to that disclosed.

In Figure 1 a plurality of parallel rays, which provide illumination for the object, are shown striking the mirror 3 from which they are reflected upwardly and directed through the divided polarizer 20. As the polarizer has its two halves or sectors symmetrically positioned with respect to the rays passing therethrough, it will polarize half of these rays in one plane and the other half of them in a plane at right angles thereto so as to respectively form the right and left hand ray sections, bundles or portions 27 and 28. These ray bundles enter the condenser 4 which concentrates them onto the object. The condenser in concentrating the rays onto the object converges and equally distributes them over the object so that each point on the object is illuminated with light from each ray section 27 and 28. In other words, each point on the object is illuminated with light directed upon the object from the right hand as well as the left hand side of the object, the light coming from the opposite sides being polarized in mutually perpendicular planes. The points on the object thus in effect act as secondary light sources and light from each of these points passes through the objective 7.

Tracing the path of light entering the objective from the chosen central point 30' on the object 30 it will be noted that this light is composed of two sections. One of these sections, namely, section 27, is formed of polarized light which while illuminating all of the point 30' is nevertheless directed onto it from the right hand side of the object. Similarly the section 28, also composed of polarized light, will illuminate all of the point 30' but this section is converged or directed onto the point from the left of the object. Other points on the object are, of course, illuminated by ray sections (not shown) similar to sections 27 and 28 and thus every point on the object will be illuminated by light directed upon it from the sides of the object itself. The section 27 proceeding upon the object from the right thereof is illustrated by the full cross hatching in the ray diagrams while the light section 28 illuminating the object from its left is distinguished therefrom by showing it in the drawing with the aid of dotted cross hatching. These sections as disclosed pass through the objective to the dividing prism 16 where the total light is split or divided by the half silvered surface 17 so that a half thereof passes to the reflecting prism 19 and then to the right ocular while the other half of the total light is directed to the prism 18 and then to the left ocular.

It should be kept in mind that the light at the lower surface of the prism 16 is comprised of a right and left section and also that the function of the prism is not to filter out or exclude light from either of these sections but rather its purpose is to pass both sections while dividing their total light into equal portions and directing each of these portions to an ocular. Thus it is that the light portions reaching each ocular are of substantially equal intensity and are composed of substantially equal parts of light 27' and 28' proceeding from each point on the object or in other words are composed of substantially equal parts of light from the right ray section 27 and the left ray section 28.

At the oculars, the analyzer 21 cuts out polarized light 28' from the left of the polarized light portion at that ocular while the analyzer 22 is oriented to exclude polarized light 27' from the right portion at that ocular. Hence an observer will view with his right eye only light rays which appear to come from the right of each point on the object while viewing only light rays appearing to come from the left with his left eye. As heretofore pointed out, the existence of this condition forms the underlying principle of stereoscopic vision so that it will be readily appreciated that I have provided means in a microscope for obtaining the desired third dimensional effect of depth in the view of the object being observed.

The foregoing explanation as well as the illustration in the drawing have considered a microscope providing an inverted image. It is for this reason that the semi-ray portions 27' and 28' appear respectively as coming from the right and the left of a point on the final image formed by the microscope of the object. Where an erecting system is employed in the instrument, the final image will be erected and the positions of the semi-ray portions 27' and 28' will be reversed at each ocular or these semi-ray portions will appear to be coming respectively from the left and right of a point on the image instead of from the right and left as shown in Figure 1 and would produce a pseudoscopic effect if the analyzers remained in the position disclosed in Figure 2. However, to obtain a stereoscopic effect it is only necessary to reverse the orientation of the analyzers by rotating each of them 90° from their positions illustrated in Figure 2.

It should be noted that, if desired, the depth effect described may be reversed or a pseudoscopic effect may be obtained. With regard to the analyzers it will be appreciated that a pseudoscopic effect can be obtained by orienting them so that light from the left of the object will pass through the right ocular while light from the right side will reach the left eye of an observer. In some instances viewing the object under both pseudoscopic and stereoscopic examination may assist in its study.

A true depth effect like that already detailed may be obtained in a binocular microscope by employing the modified form of sub-stage reflecting and concentrating device of Figure 3 in place of the mirror 3 and sub-stage condenser 4 of Figure 1. In the form disclosed in Figure 3, parallel light rays used for illuminating purposes are reflected and are also converged and concentrated by the concave mirror 31 onto the object 32 positioned upon the stage 3. By a comparison of Figure 3 with Figure 1 it will be observed that the parallel illuminating rays emanating from a light source and intercepted by the mirror of the microscope are shown in one instance as traveling in a horizontal path while in the other figure as traveling a path angularly disposed with respect to the horizontal. Such a disclosure has been made to illustrate the fact that it is immaterial how the rays are directed to a reflecting device.

Interposed in the path of these converging rays is a divided disk polarizer 20' (shown in full lines) having oppositely polarizing sectors 23' and 24'. As the polarizer 20' is identical to the polarizer 20 and is similarly positioned with respect to the rays passing therethrough, it will be appreciated that polarizer 20' will respectively form right and left polarized ray sections or bundles 35 and 36. The ray sections 35 and 36 each contain half of the rays reflected by the mirror 31 and all of the rays in one section are polarized in a plane at right angles to that of the rays of the other section. Light from the object 32 will, of course, enter a microscope objective in the manner heretofore explained in detail so that it will be realized that use of the sub-stage devices of Figure 3 with any binocular having suitable analyzers, for example cap analyzers like those already described, will permit the desired third dimensional effect of depth to be obtained.

The polarizers 20 and 20' of Figures 1 and 3 have been shown as located between the mirror and the stage of the microscope. Such expedient affords great convenience as it allows the polarizer to be removably mounted within the conventional accessory slot usually provided on a microscope. However, this location of the polarizer is not essential to the creation of the depth effect as there is a wide range for its positioning. The wide positioning range for the polarizer is due to the fact that its location is merely dependent upon the fulfillment of its function which is to cause opposite polarization of the hereinbefore described right and left hand ray sections illuminating and coming from the object.

The object under observation has been described as being illuminated by converging light rays. It will be appreciated that it is immaterial to the practice of the invention whether or not these rays are all from one beam or are from separate beams emanating from separate light sources, the beams being concentrated upon the object in converging relation to each other. Where separate beams are converged onto the object the invention comprehends as an equivalent modification, made possible and based on the heretofore described wide positioning range for the polarizer, the interposing of a separate polarizer for polarizing all the rays in each beam at a position between its light source and the object, these polarizers being oriented so that the separate beams are polarized in mutually perpendicular planes.

It should also be observed that the analyzers are like the polarizer in that they also have a positioning range which is dependent upon their function or their ability to cut out part of the polarized light directed to each ocular and to allow only the desired part to pass to the eye of an observer. Hence the analyzers may be located within each ocular tube below the oculars or above the eyepiece in the manner disclosed in Figure 1, which latter expedient as already mentioned provides a simple and commercial adaptation of the invention.

An extremely important advantage derived from my invention resides in its ready application to many kinds of microscopic examination. For example, as colors will not be affected by polarizing material, which is neutral, there is no possibility of colored light being cut out and hence no limiting restrictions on the use of stained specimen slides or in the use of color filters to obtain desired illuminating effects by coloring or removing color from the illuminating rays.

It will, of course, be appreciated from the foregoing that I have provided a practical and efficient means for creating a third dimensional effect in the view of an object under microscopic examination. At the same time I have accomplished this by the use of a practical construction which due to its simplicity makes the invention readily available to existing microscopes of the binocular mono-objective type without the necessity of their alteration and also allows the elements of my invention to be adapted, where it is desired, for fixed mounting within a microscope.

While I have shown and described the preferred embodiment of my invention, I wish it to be understood that I do not confine myself to the precise details of construction herein set forth by way of illustration, as it is apparent that many variations and changes may be made therein by those skilled in the art without departing from the spirit of the invention or exceeding the scope of the appended claims.

I claim:

1. In a microscope, the combination of a binocular body and a stage below said body, the body being provided with a single objective for forming an image of an object and with a pair of oculars for viewing said image, optical means within the body between the objective and the oculars for dividing light rays from the objective into two portions of substantially equal intensity and for directing each portion to an ocular, a condenser for converging light rays onto the object from each side thereof, a polarizer interposed in the path of the light rays before entering said condenser, said polarizer being formed of two equal sectors of polarizing material located with respect to each other and to said light rays in a position to polarize the respective halves of the light rays in mutually perpendicular planes, and an analyzer carried by each ocular, the right analyzer being oriented to cut out light rays reaching said ocular and coming from the left side of the object and the left analzer being oriented to cut out light rays reaching said ocular and coming from the right of the object.

2. In a microscope, the combination of a binocular body and a stage below said body, the body being provided with a single objective for forming an image of an object and with a pair of oculars for viewing said image, optical means within the body between the objective and the oculars for dividing light rays from the objective into two portions of substantially equal intensity and for directing each portion to an ocular, a concave mirror for directing and converging light rays from a source onto the sides of the object, a polarizer interposed in the path of said light rays between the light source and the object, said polarizer being formed of two equal sectors of polarizing material located with respect to each other and to said light rays in a position to polarize the respective halves of the light rays in mutually perpendicular planes, and an analyzer carried by each ocular, the right analyzer being oriented to cut out light rays reaching said ocular and coming from the left side of the object and the left analyzer being oriented to cut out light rays reaching said ocular and coming from the right of the object.

3. In a microscope, the combination of a binocular body and a stage below said body, the body being provided with a single objective for forming an image of an object and with a pair of oculars for viewing said image, optical means within the body between the objective and the oculars for dividing light rays from the objective into two portions of substantially equal intensity and for directing each portion to an ocular, means for directing light rays onto the object from each side thereof, polarizing means having two substantially equal parts for polarizing light in mutually perpendicular planes, said polarizing means interposed in the path of the light rays directed onto the object whereby one of said parts intercepts and polarizes those light rays directed onto the object from one side thereof and the other of said parts intercepts and polarizes those light rays directed onto the object from the opposite side thereof, analyzing means associated with one ocular and having its plane of polarization parallel to the plane of polarization of one part of said polarizing means and other analyzing means associated with the other ocular and having its plane of polarization parallel to the plane of polarization of the other part of said polarizing means.

CYRIL A. SCHULMAN.